Figure 1:
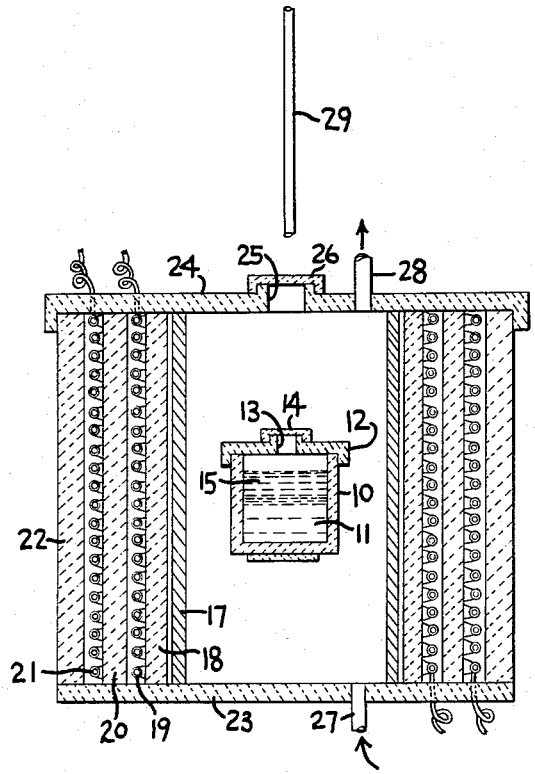

April 26, 1966  F. R. HOHMANN  3,248,193

METHOD FOR DRAWING GLASS

Filed March 14, 1960

INVENTOR
FREDERICK R. HOHMANN

BY  Chisholm and Spencer

ATTORNEYS 3,248,193
METHOD FOR DRAWING GLASS
Frederick R. Hohmann, New Kensington, Pa., assignor to Pittsburgh Plate Glass Company, a corporation of Pennsylvania
Filed Mar. 14, 1960, Ser. No. 14,721
5 Claims. (Cl. 65—32)

This application relates to the drawing of glass from a bath of molten glass and especially to the drawing of glass from a bath of molten glass and through a liquid material less dense than the glass floating on the surface of the bath. The drawn glass is thus protected during its formative stage from extraneous forces such as air currents.

The liquid material less dense than glass includes such materials which are nonreactive with the glass and have a density of less than 2.5 gm./cc., the density of the usual glass known as sheet glass produced by drawing from a bath of molten glass. Metals having melting temperatures such that they are molten when floated on the surface of the molten glass may be used.

In the present specification there will be described a process whereby glass is drawn from a molten bath of glass through a liquid material floating on the surface of the glass and completely covering the surface of the molten bath. The apparatus employed for this process is illustrated, in section, in the single figure of the drawing accompanying this specification and forming a part thereof.

Figure 2:
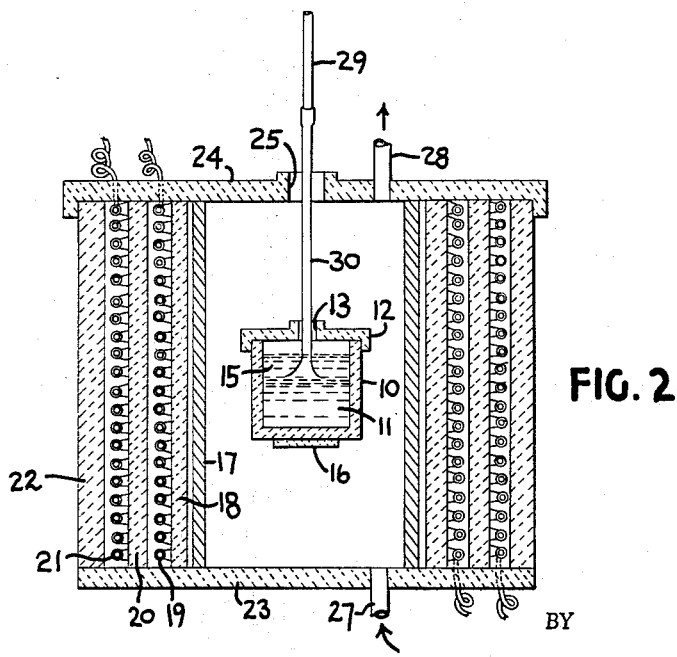

Reference is now made to the drawing wherein like reference characters are used to refer to like parts and in which FIG. 1 is an illustration of an apparatus for drawing a shape of glass through a liquid bath, and FIG. 2 is an illustration similar to FIG. 1 showing a shape of glass being drawn through a liquid bath.

In the drawing, 10 represents a ceramic pot in which glass 11 is melted and retained as a molten bath, the pot being provided with a cover 12 having an opening 13 therethrough. A cover member 14 is slidable over the opening 13, so as to enclose the pot or provide access to the contents thereof. The glass 11 within the pot 10 is shown as having a liquid material 15 floating on and covering its surface. The pot 10 is supported by a support 16 attached to a stainless steel tube 17 in turn surrounded by a refractory tube 18 having a heating coil 19 wound around its outer periphery. The heating coil 19 is energized by connection with a suitable source of electrical power, not shown. A second refractory tube 20 surrounds the wound tube 18 and also has a heating coil 21 wound around its periphery. The heating coil 21 is likewise energized by connection with a suitable source of electrical power, not shown. An insulating tube 22, for example, constructed of asbestos or the like surrounds the tube 20. The assembly of tubes 17, 18 and 20 are supported on an insulating bottom 23, of asbestos or the like, and a cover 24 is placed over the assembly. The cover 24 is also of insulating material, such as asbestos, or the like, and has an opening 25 therethrough in vertical registry with the opening 13 of the pot 10. A slide cover 26 is provided for the opening 25, so as to enclose the assembly or afford access to the interior of the tube 17. Inlet and outlet conduits 27 and 28, respectively, are provided for introducing and withdrawing a gas, such as nitrogen into and from the space surrounding the pot 10 and also above the surface of the molten glass, so as to establish a controlled atmosphere which protects the liquid material 15 from oxidation.

In order to draw glass from the bath of glass 11, and through the fluid material 15, a bait 29, which may be a rod of glass, is introduced through the openings 25 and 13, through the material 15 and into the glass. Glass adheres to the bait and is withdrawn as a continuous shape 30.

As previously stated, the liquid materials may be metals having densities less than the glass, so that they float on the surface of the glass. They also must have a melting temperature so that they are molten when floating on the surface of the molten glass and must be nonreactive with the glass. Examples of such metals are alloys of magnesium and aluminum and are as follows:

| Alloy | Density, gm./cc. | Melting Point, °F. |
|---|---|---|
| 90% Mg, 10% Al | 1.839 | 1,100 |
| 70% Mg, 30% Al | 2.028 | 850 |
| 50% Mg, 50% Al | 2.22 | 840 |
| 30% Mg, 70% Al | 2.41 | 835 |

Of course, with alloys such as above, a protective atmosphere is desirable, so as to prevent or inhibit oxidation thereof and also to prevent combustion at the elevated temperatures encountered in the process. Nitrogen is a suitable gas to establish the requisite atmosphere within the tube 17 and above the fluid material.

The glass so produced is free from metal films and exhibits an extremely smooth surface.

*Example*

As a specific example, using apparatus above described, a quantity of glass having a density of 2.5 gm./cc. was introduced into a pot; the pot was inserted within a stainless steel tube 17 and the coils 19 and 21 were energized by connecting them to electrical power sources. The temperature of the glass was raised to approximately 2500° F. so as to melt the glass and to drive out any occluded gases therein. By controlling the input of power to the coils 19 and 21 the temperature of the glass was reduced to approximately 2000° F. The slides or covers 12 and 26 were positioned to cover the openings 13 and 25, respectively, and gas was introduced within the assembly so as to establish a protective atmosphere above the molten glass and within the tube 17. A quantity of metal alloy having a composition of 90% Mg and 10% Al was introduced in a solid state through the openings 13 and 25 (with their covers removed) and onto the surface of the molten bath of glass. The covers were replaced and the alloy was allowed to melt and flow over and cover the surface of the bath of glass. The covers 12 and 26 were removed and a bait comprising a rod of glass was lowered through the openings and molten metal into the molten glass. The direction of movement of the bait was reversed and glass was successfully drawn in a continuous shape from the molten glass through the molten metal floating on and covering the surface of the glass.

I claim:
1. A method of drawing glass comprising the steps of establishing a pool of molten glass,
  floating an essentially immiscible layer of liquid on the surface of said pool, said liquid being non-reactive with said glass,
  introducing a bait into said pool of molten glass,
  withdrawing said bait in contact with said molten glass from said pool to draw glass therefrom and
  drawing glass free from a film of said liquid upwardly through and in direct contact with the liquid layer.
2. A method as recited in claim 1 wherein said liquid is a metal alloy.
3. A method as recited in claim 2 wherein said metal alloy is a magnesium-aluminum alloy.
4. A method as recited in claim 3 wherein said magnesium-aluminum alloy contains 30 to 90 percent magnesium and 70 to 10 percent aluminum.

5. A method as recited in claim 1, further including maintaining a protective atmosphere over said liquid.

References Cited by the Examiner

UNITED STATES PATENTS

| | | | |
|---|---|---|---|
| 1,422,036 | 7/1922 | Crowley et al. | 65—26 |
| 2,233,622 | 3/1941 | Lytle | 65—32 |
| 2,363,695 | 11/1944 | Ruppik. | |
| 2,741,877 | 4/1956 | Dobrovolny | 65—182 X |
| 2,754,172 | 7/1956 | Went et al. | 23—51 |
| 2,754,559 | 7/1956 | Fromson | 65—182 X |

FOREIGN PATENTS 797,102   6/1958   Great Britain.

HOWARD R. CAINE, *Acting Primary Examiner.*

IVAN R. LADY, ARTHUR P. KENT, WILLIAM B. KNIGHT, DONALL H. SYLVESTER, *Examiners.*